(12) United States Patent
Steiner

(10) Patent No.: US 11,582,980 B2
(45) Date of Patent: Feb. 21, 2023

(54) METHOD FOR HEATING MILK OR MILK FOAM

(71) Applicant: STEINER AG WEGGIS, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 381 days.

(21) Appl. No.: 16/679,450

(22) Filed: Nov. 11, 2019

(65) Prior Publication Data

US 2020/0154724 A1 May 21, 2020

(51) Int. Cl.
| | |
|---|---|
| *A23C 9/152* | (2006.01) |
| *A47J 31/44* | (2006.01) |
| *B01F 23/235* | (2022.01) |
| *B01F 35/221* | (2022.01) |

(52) U.S. Cl.
CPC ......... *A23C 9/1524* (2013.01); *A47J 31/4485* (2013.01); *B01F 23/235* (2022.01); *B01F 35/2211* (2022.01); *B01F 35/2213* (2022.01); *B01F 35/2215* (2022.01); *A23C 2210/30* (2013.01)

(58) Field of Classification Search
CPC ...... A23L 33/185; A23L 33/19; A23L 33/115; A23L 33/21; A23P 30/10; A21D 13/80; A21D 13/062; A23G 1/30; A23V 2002/00
USPC ........................................................ 426/656
See application file for complete search history.

(56) References Cited

U.S. PATENT DOCUMENTS

| | | | |
|---|---|---|---|
| 7,178,453 | B2 | 2/2007 | In Albon |
| 7,527,818 | B2 | 5/2009 | Dirren |
| 8,357,416 | B2 | 1/2013 | Schindler et al. |
| 8,925,441 | B2 | 1/2015 | Steiner |
| 2015/0327715 | A1 | 11/2015 | Steiner |
| 2017/0164644 | A1 | 6/2017 | Steiner |
| 2017/0340161 | A1* | 11/2017 | Andreis ............... A47J 31/4489 |

(Continued)

FOREIGN PATENT DOCUMENTS

| | | |
|---|---|---|
| CN | 201223297 Y | 4/2009 |
| DE | 3838235 A1 | 6/1989 |

(Continued)

OTHER PUBLICATIONS

Abstract of DE102006043905.

(Continued)

*Primary Examiner* — Brent T O'Hern

(74) *Attorney, Agent, or Firm* — Brian Roffe

(57) ABSTRACT

With a method for heating in particular milk or milk foam, in which the milk or the milk/air mixture is conveyed through a passage opening and hot steam is conveyed through at least one steam line transversely into this passage opening. The passage opening and the at least one inlet opening opening transversely into the steam line, the steam pressure in this and the pressure and the pressure in the passage opening with flowing milk or milk/air mixture are so coordinated that the hot steam at the at least one transverse inlet opening condenses in the passage opening directly on contact with the milk or the milk/air mixture. Consequently the additional energy produced by the phase change from steam to condensate water is transmitted directly as heat to the heat in the milk or the milk/air mixture.

20 Claims, 1 Drawing Sheet

(56) References Cited

U.S. PATENT DOCUMENTS

| | | |
|---|---|---|
| 2018/0098659 A1 | 4/2018 | Steiner |
| 2019/0008313 A1 | 1/2019 | Steiner |
| 2019/0008314 A1 | 1/2019 | Steiner |

FOREIGN PATENT DOCUMENTS

| | | |
|---|---|---|
| DE | 102006043905 A1 | 4/2008 |
| EP | 2798989 A1 | 11/2014 |
| WO | 2015154211 A1 | 10/2015 |
| WO | 2018103972 A1 | 6/2018 |

OTHER PUBLICATIONS

Abstract of EP 2798989.
Abstract of DE3838235.
Abstract of CN 201223297.

* cited by examiner

METHOD FOR HEATING MILK OR MILK FOAM

FIELD OF THE INVENTION

The invention relates to a method for heating milk or milk foam, together with a device for carrying out the method wherein in the method, the milk or a milk/air mixture is conveyed through a passage opening and hot steam is conveyed through at least one steam line transverse to this passage opening, while in the device, there is a passage opening for the milk or the milk/air mixture and at least one inlet opening of a steam line opening transversely into the passage opening for the supply of hot steam.

BACKGROUND OF THE INVENTION

In a known device according to the published document DE-OS 38 38 235, a supply of steam is arranged by means of a steam inlet nozzle, directed transversely into an elongated chamber, through which milk is supplied in the direction of its longitudinal axis by means of a piston pump. In addition, a flow restrictor is provided at the outlet end of this chamber, such that the milk in the chamber remains in contact with the injected steam so as to extend the heat exchange between it and the steam for sufficient time for it to reach the specified milk temperature. Thus, with the steam injected radially or tangential into the chamber, turbulence is generated, amplifying the exchange of heat. In practice, however, it has emerged that, with the generation of turbulence, the milk is not heated rapidly enough and optimum milk foam formation is not achieved.

OBJECTS AND SUMMARY OF THE INVENTION

An object of the invention is to provide a method and a device with which, when the milk and/or milk/air mixture is heated efficiently, an excellent milk foam is produced when a milk/air mixture is passed through.

This problem is solved in accordance with the invention by providing in the method that the passage opening and at least one inlet of a steam line connected transversely to the passage opening are coordinated so that an appropriate steam pressure is provided in these and the pressure in the passage opening with flowing milk or milk/air mixture is such to cause the hot steam with at least one transverse inlet opening to condense in the passage opening directly during contact with the milk or milk/air mixture flowing through. As a result, the additional energy arising from the phase change of steam to condensate water is directly transmitted as heat into the milk or the milk/air mixture. In the device, the passage opening for the milk or the milk/air mixture is configured as a pipe and the at least one inlet opening of the steam line is dimensioned with an approximately equal or somewhat smaller inner diameter than that of the passage opening.

With the method in accordance with the invention, on the one hand, the steam pressure in the steam line and the pressure in the passage opening for the flowing milk and milk/air mixture are so adjusted, and on the other, the passage opening and an inlet opening transversely into this of the at least one steam line are so dimensioned that the hot steam condenses in the passage opening on contact with the milk or milk/air mixture flowing through.

Thus, the additional thermal energy arising from the phase change of steam into water is transferred directly into the milk or the milk/air mixture and a very efficient increase of temperature is achieved from a relatively small supply of hot steam.

To guarantee this maximum heating power, the steam pressure in the steam line is advantageously adjusted by a pressure reducing valve to achieve approximately constant pressure at the inlet opening.

With the device in accordance with the invention for this method, the passage opening for the milk or milk/air mixture is designed as a pipeline and the at least one inlet of the steam line opening transversely to this is designed with an approximately equal or somewhat smaller inside diameter than that of the passage opening. Thus, this forms a simple configuration for heating milk or a mixture, by means of which extremely efficient heating is enabled.

BRIEF DESCRIPTION OF THE DRAWINGS

The invention together with further advantages of the same are explained in more detail in the following with the aid of exemplary embodiments with reference to the drawings wherein.

DETAILED DESCRIPTION OF THE INVENTION

Figure 1:
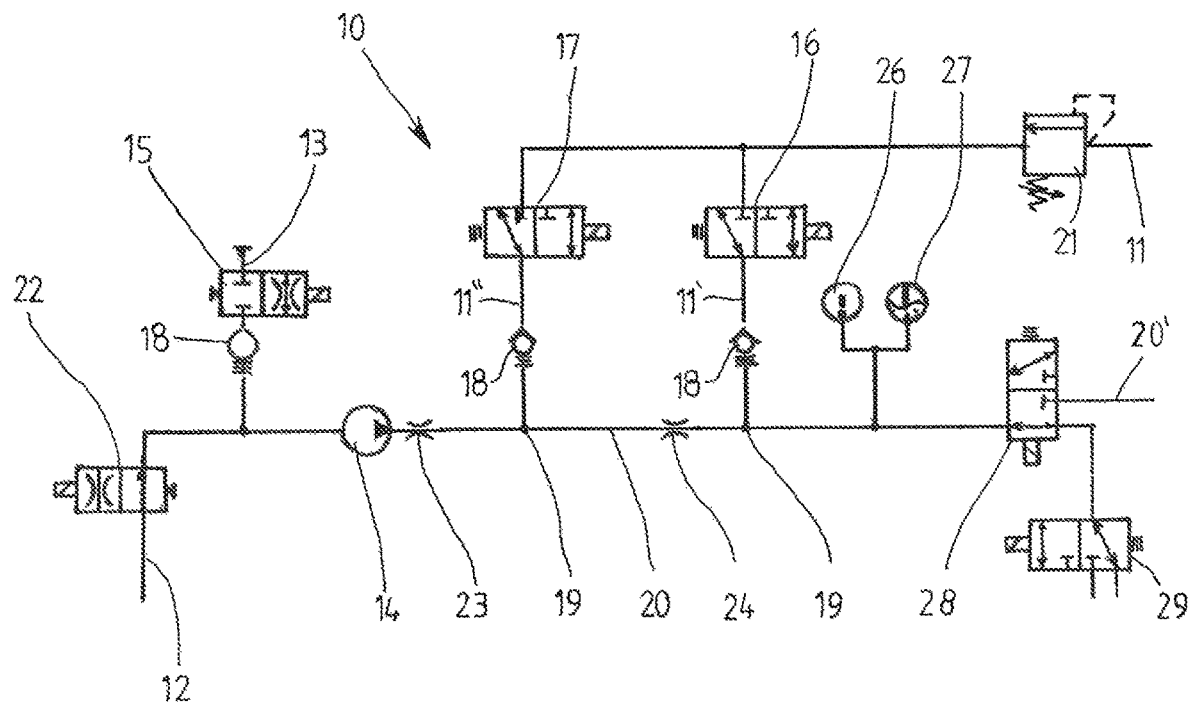
FIG. 1 is a hydraulic diagram of a device in accordance with the invention.

FIG. 1 shows a device 10 for heating milk or milk foam, in particular, with steam. The steam is advantageously supplied via a steam line 11 from a boiler, provided as a non-limiting example of a steam source, which is supplied from a water tank or a water pipeline by means of a water pump, which is not shown in more detail.

The milk, on its part, is drawn from a cooled container or other source thereof, not shown, through a suction line 12 by a controllable pump 14, for example, a gear pump. For preparation of milk foam, an air supply line 13 with a switchable air control valve 15 is connected upstream of the pump 14. In principle, other drinks, for example chocolate or other mixed drinks, can be heated, as medium, with the equipment.

Furthermore, a conventional cleaning circuit can be provided with the device 10 described, of which a supply line with a cleaning valve 29, which can be switched on and off, is shown. Through this circuit, the lines carrying milk or milk foam in operation are rinsed in the usual way, advantageously after each or a number of uses, with water or with a cleaning agent.

A two-way valve 28 serves for passage of milk or milk foam through a line 20' to an outlet, not shown in more detail, to fill a coffee cup or similar. This valve 28 can be closed or alternatively can be opened for passage of rinsing water.

Figure 2:
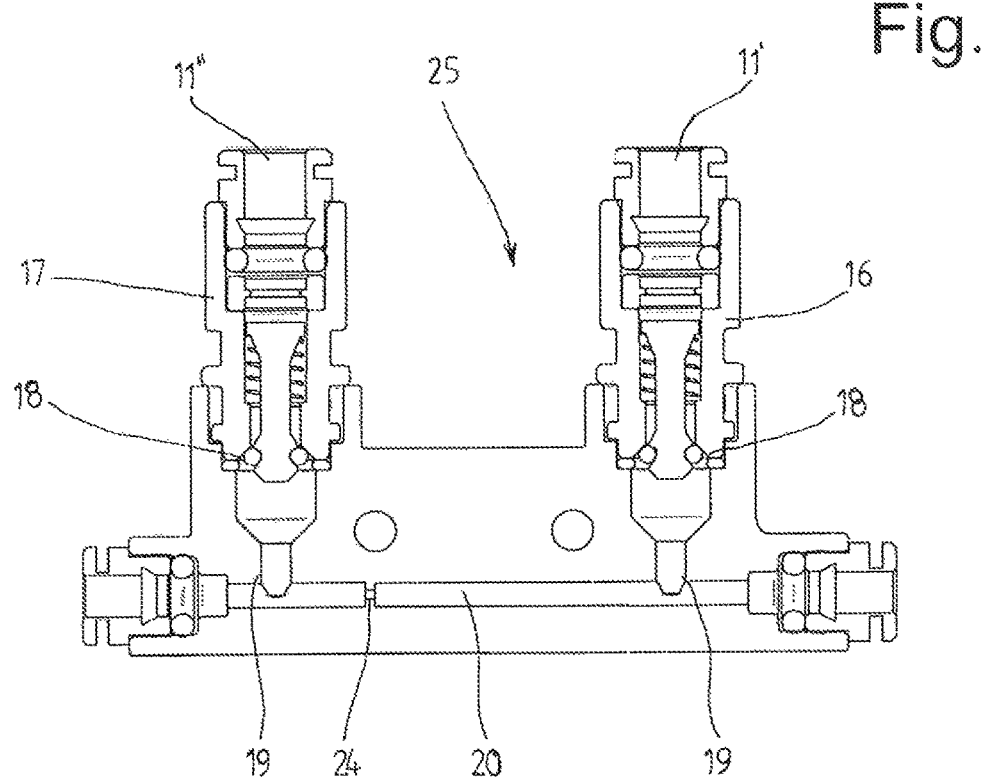
FIG. 2 is a partial longitudinal section of the device in accordance with FIG. 1.

With the method for heating milk or milk foam, with the air supply switched on, the milk or the milk/air mixture is conveyed by the pump 14 through a passage opening 20 and the hot steam passes through the steam line 11 and thereafter through two adjacent but separate steam lines 11', 11" transversely into this passage opening 20 (see FIG. 2). Passage opening 20 may be a pipeline, flow line or conduit, and may be elongate or formed by an elongate, tubular part. A shut-off valve 16, 17 and a check valve 18 are associated with each steam line 11', 11", wherein these shut-off valves 16, 17 can be individually opened or closed. The check valves 18 with the air control valve 15 also prevent milk flowing from the passage opening 20 into the steam line 11.

According to the invention, the passage opening 20 and the two inlet openings 19 of the steam line 11 respectively opening transversely into the passage opening 20, are coordinated so that the steam pressure in the steam line 11 and the pressure in the passage opening 20, with milk or milk/air mixture flowing through, cause the hot steam to condense with the transverse inlet openings 19 in the passage opening 20 in direct contact with the milk or milk/air mixture, so that the additional energy resulting from the phase change from steam to condensate water is transmitted directly into heat in the milk or the milk/air mixture and the efficient rapid temperature increase follows therewith.

With this method according to the invention for heating the milk or the milk/air mixture in this passage opening 20, in the form of a pipeline and not as a chamber, it surprisingly results that, by coordination with the steam line 11, in which the inlet openings 19 arranged in this passage opening are not configured as nozzles, an optimal heat transfer is obtained.

The steam pressure in the steam line 11 and the pressure in the passage opening 20 with flowing milk or flowing milk/air mixture can be preset appropriately, whereby the static pressure in the passage opening 20 depends on the flow rate.

To increase the heating output to the milk or milk/air mixture flowing through, the two inlet openings 19, one behind the other, are each connected to a respective steam line 11', 11". Obviously, only one or more than two inlet openings 19 could be provided, with a corresponding number of valves, check valves and steam lines.

The steam pressure in the steam line and its temperature are preferably between about 1.5 bar and about 2.5 bar and between about 110° C. and about 140° C. These can be adjusted according to the required performance characteristics of the device 10.

A first restrictor 23 is disposed in the passage opening 20, after the pump 14 but before the first inlet opening 19, and a second restrictor 24 is disposed between the two inlet openings 19. These restrictors 23, 24 cause a slowing of the flow rate of the milk or the milk/air mixture so that, in the milk/air mixture, which already has a foamy consistency after the pump outlet, the air bubbles contained therein adopt a smaller diameter, on average, than it would be in the absence of the integrated restrictors. These two successive restrictors 23, 24 have different levels of restriction, preferably between about 20% and about 60% of the inside diameter of the inlet opening 20. The level of restriction of the second restrictor 24 is advantageously smaller than that of the preceding restrictor 23.

Because it is usual to use a boiler as the source of the steam, and due to the fluctuations of the pressure of the steam that arise during its operation, the steam line 11 connected to the boiler is equipped with a pressure reducing valve 21 to produce an approximately constant steam pressure at the inlet openings 19 at all times. This pressure reducing valve 21 reduces or increases the amount of steam flowing through according to the pressure, so that an approximately constant pressure is produced at the outlet of this valve 21.

In addition, a changeover valve 22 is positioned in the intake suction pipe or line 12, preferably between the milk container (not shown) and the air supply line 13, which is opened during the passage of milk, and conversely is closed in the other switch position, when milk foam has to be produced, being in the form of a throttle valve. In order to compensate for the falling level in the milk container, i.e., when the milk container is refilled; as is known a higher static pressure exists at the lower end of the suction pipe or line 12 above the base of the container. During the emptying of the container, this pressure drops and quantitatively less milk is drawn given a constant suction power of the pump 14. However, a relatively equal amount of milk is pumped at each level because of this throttle valve, because this pressure difference arising from the filling level is no longer significant.

For the air control valve 15, with which the amount of air supply is controlled or regulated, within the scope of the invention, an adjustable needle valve is used as variable control element within the scope of the invention. However, a proportional valve or the like could be used.

These valves 15, 21, 22 additionally ensure that constant conditions are maintained during the heating of the medium passing through and that, with them, the quality of the milk foam produced is always of the highest.

With the device 10, according to the invention the passage opening 20 for the milk or the milk/air mixture is configured as a pipeline, not a chamber, and the at least one inlet opening 19 of the steam pipeline 11 opening transversely into the pipeline is dimensioned with an approximately equal or somewhat smaller inside diameter than that of the passage opening 20 (see FIG. 2).

Conveniently, the inside diameters of the passage opening 20 and/or the inlet openings 19 are each between about 2.0 mm and about 4.0 mm. This dimensioning of the inside diameter is related to the throughput of the medium passing through. The longitudinal axes of the passage opening 20 and the steam line 11 intersect at least approximately at the inlet opening 19. With this situation, the cross section of the inlet opening 19 covers the pathway running transverse to it of the passage opening 20.

In addition, a thermometer 26 and a measurement device 27 for determination of the milk foam consistency are indicated, being integrated after or in the passage opening 20 of the milk foam produced. The thermometer 26 measures the temperature of the heated milk or the milk foam produced during conveyance.

With these measurements and determination of the milk foam consistency, this can be monitored and even parameters such as proportion of air, pump output, steam pressure or others can be adjusted and the pressures in the passage opening 20 or the inlet openings 19 can be varied, enabling regulation to achieve predetermined target values.

According to FIG. 2, a hydraulic block 25 is formed as a module for the passage opening 20 and the inlet openings 19 with the valves 16, 17, 18. Hydraulic block 25 also includes restrictor 24. This enables simple assembly or dismantling when a repair is required.

This method according to the invention and this device for heating the milk can be applied or integrated both with a milk module as a separate unit or in a coffee machine, in particular for production of cappuccino or other hot milk drinks.

The invention claimed is:

1. Method for heating milk or milk foam, comprising the steps of:
   conveying the milk or the milk foam through a passage opening in a flow direction;
   conveying steam through at least one steam line, the steam having a pressure in the at least one steam line of between about 1.5 bar and about 2.5 bar and a temperature in the at least one steam line of between about 110° C. and about 140° C. and thereby being considered hot steam; and directing the hot steam out of a respective opening of each of the at least one steam line into the passage opening in a direction transverse to the flow direction of the milk or the milk foam through the passage opening and into direct contact with the milk or the milk foam flowing through the passage opening in the flow direction such that the hot steam condenses in the passage opening when directly contacting the milk or the milk foam flowing through the passage opening in the flow direction and additional energy arising from a phase change of the hot steam to condensate water is directly transmitted as heat into the milk or the milk foam flowing through the passage opening in the flow direction.

2. Method in accordance with claim 1, further comprising adjusting pressure in the at least one steam line using a pressure reducing valve to equalize pressure with an approximately constant pressure at the respective opening.

3. Method in accordance with claim 1, further comprising:
controlling pressure of the hot steam in the at least one steam line to be between about 1.5 bar and about 2.5 bar; and
controlling the temperature of the hot steam in the at least one steam line to be between about 110° C. and about 140° C.

4. Method in accordance with claim 1, further comprising:
providing a source of hot steam; and
connecting the at least one steam line to the source of hot steam such that the step of conveying the hot steam through the at least one steam line comprises conveying the hot steam from the source of hot steam.

5. Method in accordance with claim 4, further comprising regulating pressure of the hot steam by passing the hot steam through at least one pressure reducing valve between the source of hot steam and the respective opening.

6. Method in accordance with claim 5, further comprising controlling the at least one pressure reducing valve to produce an approximately constant pressure in the at least one steam line before the respective opening.

7. Method in accordance with claim 1, wherein the milk is heated, further comprising:
providing a milk container as a source of the milk; and
coupling the passage opening to a suction line leading from the milk container such that the step of conveying the milk through the passage opening in the flow direction comprises conveying the milk from the milk container.

8. Method in accordance with claim 1, further comprising:
providing a milk container as a source of the milk;
drawing the milk from the milk container into a suction line leading from the milk container; and
controlling whether the milk or the milk foam is heated by controlling position of a changeover valve in the suction line to switch between a position in which only the milk is passed to the passage opening and a position in which air is directed into the milk to cause the milk foam to be passed into the passage opening.

9. Method in accordance with claim 8, further comprising controlling directing of the air through the changeover valve using an air control valve.

10. Method in accordance with claim 1, wherein the step of conveying the hot steam through the at least one steam line comprises conveying the hot steam through two adjacent and separate steam lines, further comprising controlling flow rate of the milk or the milk foam through the passage opening using a restrictor in the passage opening between locations at which hot steam is directed into the milk or the milk foam in the passage opening from the respective opening of each of the two steam lines.

11. Method in accordance with claim 1, wherein the passage opening is provided by a pipeline, flow line, conduit or an elongate, tubular part defining an interior space through which the milk or the milk foam is flowing in the flow direction and the respective opening is situated inside of the interior space of the pipeline, the flow line, the conduit or the elongate, tubular part.

12. Method in accordance with claim 1, wherein the at least one steam line extends into the passage opening such that the respective opening is inside of the passage opening.

13. Method in accordance with claim 1, wherein the passage opening has a same diameter immediately before and after each respective opening.

14. Method in accordance with claim 1, further comprising regulating flow of the hot steam through the at least one steam line using a shut-off valve and a check valve in each of the at least one steam line.

15. Method in accordance with claim 1, further comprising coordinating the passage opening and the respective opening of the at least one steam line such that pressure of the hot steam in the at least one steam line and pressure in the passage opening, when the milk or the milk foam is flowing through the passage opening in the flow direction, aids in causing the hot steam to condense as the hot steam flows out of the respective opening in the direction transverse to the flow direction of the milk or the milk foam in the passage opening into direct contact with the milk or the milk foam flowing through the passage opening in the flow direction.

16. Method in accordance with claim 1, wherein the passage opening is in the form of a pipeline and the respective opening is configured relative to the pipeline to cause the hot steam and the milk or the milk foam to mix in the pipeline when the milk or the milk foam is flowing in the flow direction through the pipeline.

17. Method in accordance with claim 1, further comprising controlling flow rate of the milk or the milk foam through the passage opening using a restrictor in the passage opening before an initial one of the respective opening and another restrictor in the passage opening after the initial one of the respective opening.

18. Method in accordance with claim 1, further comprising providing the respective opening with a smaller inner diameter than a diameter of the passage opening or a same inner diameter as the diameter of the passage opening.

19. Method in accordance with claim 1, wherein a longitudinal axis of the passage opening and a longitudinal axis of the at least one steam line intersect at the respective opening.

20. Method in accordance with claim 1, wherein the passage opening has a longitudinal axis and the flow direction is in a longitudinal direction between an inlet and outlet of the passage opening, the respective opening being situated inside the passage opening at a location at which the milk or the milk foam flows in the longitudinal direction between the inlet and the outlet of the passage opening.

* * * * *